UNITED STATES PATENT OFFICE.

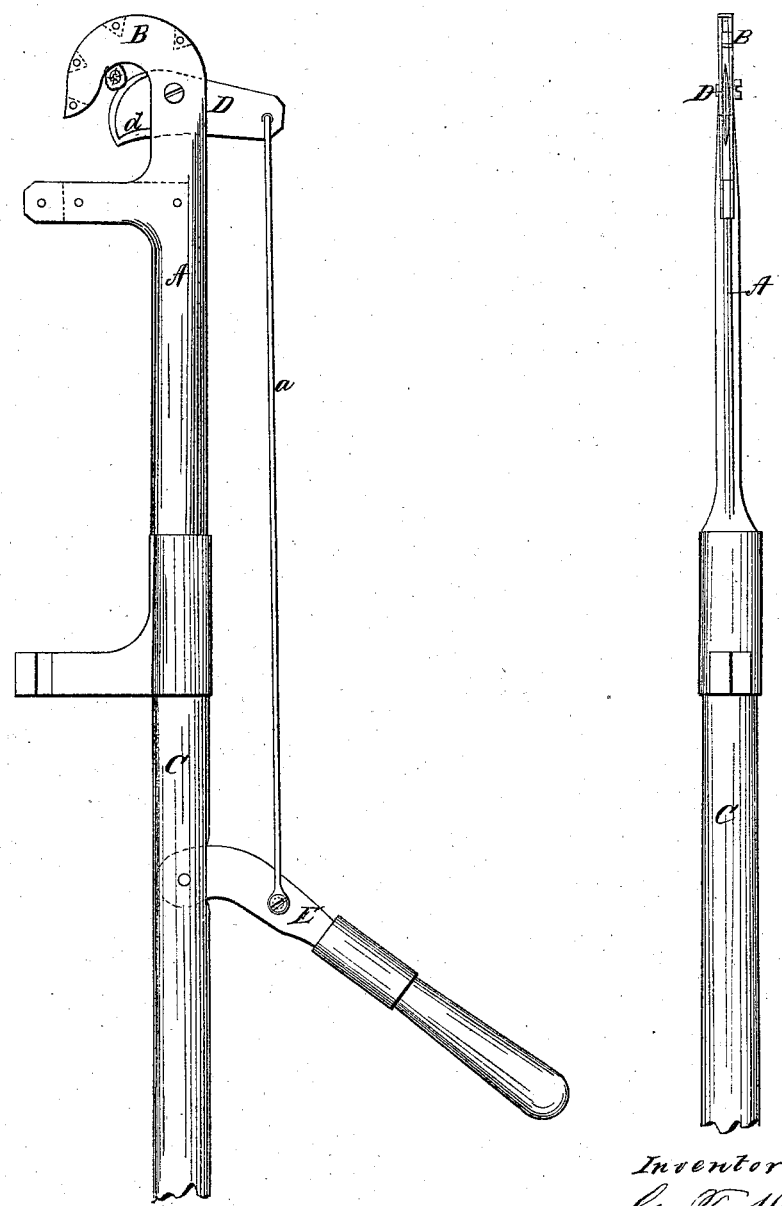

G. F. WATERS, OF WATERVILLE, MAINE.

IMPROVEMENT IN PRUNING INSTRUMENTS.

Specification forming part of Letters Patent No. 58,326, dated September 25, 1866.

*To all whom it may concern:*

Be it known that I, G. F. WATERS, of Waterville, in the county of Kennebec and State of Maine, have invented a new and Improved Pruning Instrument; and I do hereby declare that the following is a full, clear, and exact description thereof, which will enable others skilled in the art to make and use the same, reference being had to the accompanying drawings, forming part of this specification, in which—

Figure 1 is a side view of my pruning instrument. Fig. 2 is a front edge view of the same.

Similar letters of reference indicate like parts.

My invention consists in the employment or use, in connection with a proper-shaped hook for catching hold of the twig or branch, of an eccentric cutter operated by a hand-lever, connected therewith.

To enable others to understand my invention, I will proceed to describe it.

A represents the shank of the device, which is bent or curved at its outer end in the form of a hook, B.

The shank is attached to a pole, C, in any proper way to increase its length, if such be desired.

In the present instance the hook is formed of two plates or strips of metal. I should prefer malleable cast-iron. These plates are riveted together in such manner than an open space will be left between them.

In most cases I insert at proper points between the plates a triangular piece of metal of the suitable thickness, and drive the rivets through the plates and this piece at such points. In this way I leave a space between the two plates in front of the cutter-blades, and the object of this space is to produce an escape for such chips, pieces of bark, &c., as are forced between the plates by the cutter. And this is an important feature, for were the recess closed at its top the chips, &c., would have to be picked out of, instead, as in the present case, being forced out by the cutter. Hence the hook can free itself, and thus produce a perfectly-working instrument in this respect. Between these strips, near where the bend of the hook commences, an eccentric cutter, D, is pivoted, its end next to the hook being rounded and sharpened, so as to produce a broad and good cutting-edge or blade. The lower straight side, *d*, of the cutter D is sharpened, so as to constitute a cutting-edge, and hence both edges of the cutter are adapted to sever a twig. To the outer edge of this cutter a rod, *a*, is attached, and it is carried down and connected to a lever, E, which has its end pivoted in the pole C, so that by drawing down the lever E the cutter will be thrown up with sufficient force to cut off the twig or branch that may have been caught by the hook for that purpose.

The knife cuts the twig or branch through, and sinks into the recess between the plates of the hook.

The instrument can be easily operated. The pole C is taken in one hand and the hook placed over the twig. Then by merely driving down upon the lever E the knife will press against the twig and sever it with a drawing cut.

The instrument can be made of any length by merely pivoting the lever E farther down upon the pole and making the rod *a* of a sufficient length. Thus the user is enabled, in trimming high bushes and trees, to perform the operation with comparative ease; and in trimming vines it will not be necessary to change his position often, and he can reach places where it would be difficult for him to climb in order to use an ordinary pruning instrument.

Instead of making the hook of two plates and connecting them together, a single piece may be used, and a suitable recess formed therein to allow a proper working of the cutter. And I can use a cord instead of the rod *a*, by applying a spring in such relation to the cutter that the outer end of the latter will be drawn up after the lever E has been relieved, and this leaves the hook free to catch another twig or branch.

What I claim as new, and desire to secure by Letters Patent, is—

1. The combination of the eccentric cutter D with the hook B, when the parts are constructed and arranged to operate in the manner and for the purposes herein specified.

2. The lever E in combination with the cutter D, substantially as and for the purpose herein specified.

GEO. F. WATERS.

Witnesses:
   E. R. DRUMMOND,
   D. F. GOODRICH.